Figure 1:
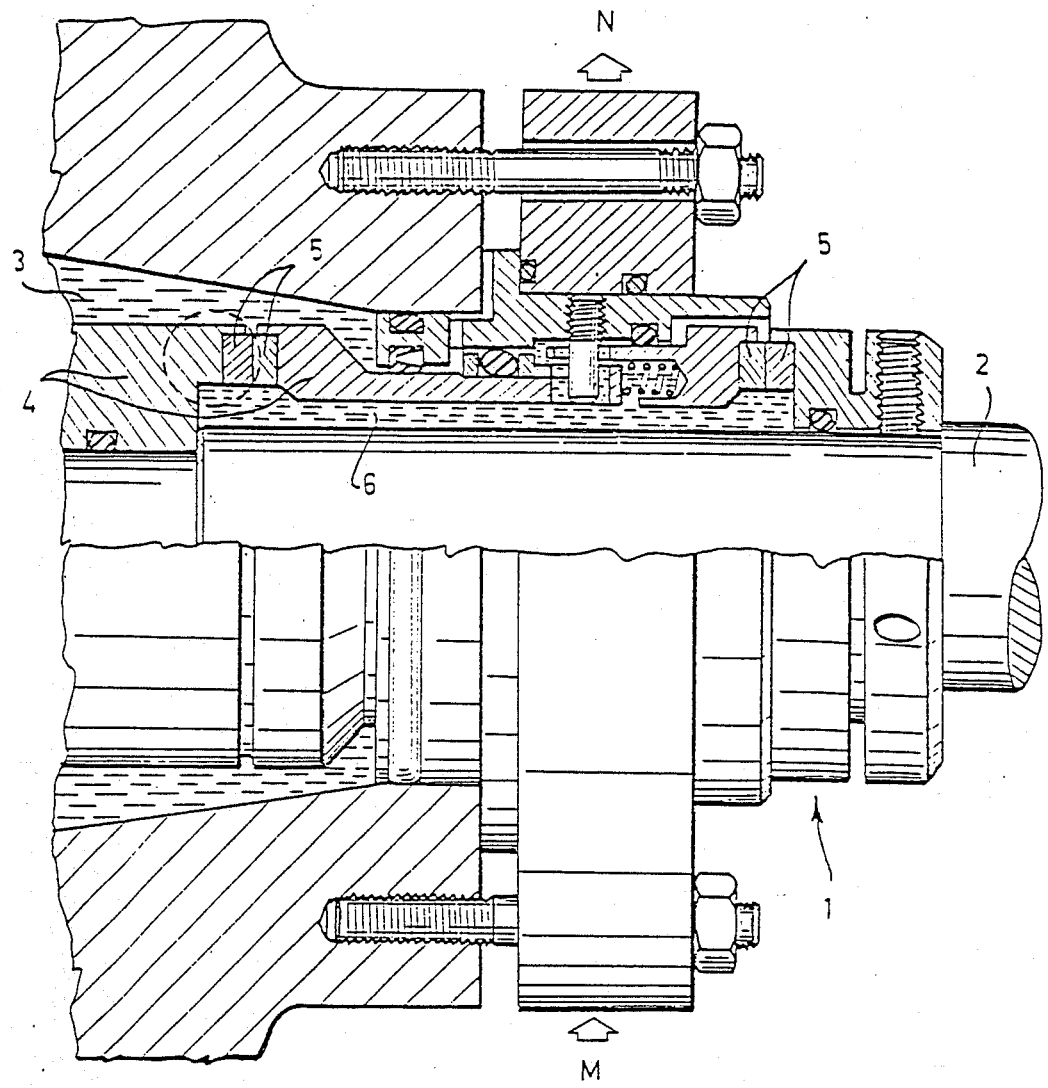

United States Patent [19]

Kuusela et al.

[11] Patent Number: 4,700,953
[45] Date of Patent: Oct. 20, 1987

[54] SLIDE-RING SEAL

[75] Inventors: Juhani Kuusela, Petäjävesi; Esko Lopperi; Markku Lummila, both of Jyväskylä; Pertti Saksala, Muurame; Esa Salovaara, Keuruu; Tuomo Suhonen, Jyväskylä; Perttinä Harri, Jyväskylä; Esko Poikolainen, Jyväskylä; Hannu Trygg, Jyväskylä, all of Finland

[73] Assignee: Oy Safematic Ltd., Hyrla, Finland

[21] Appl. No.: 795,647

[22] Filed: Nov. 6, 1985

[30] Foreign Application Priority Data

Nov. 6, 1984 [FI] Finland .................................. 844340

[51] Int. Cl.⁴ .............................................. F16J 15/34
[52] U.S. Cl. .................................... 277/38; 277/81 R; 277/93 SD; 277/194
[58] Field of Search ................... 277/44, 47, 81 R, 83, 277/182, 192, 193, 194, 195, 198, 199, 174, 81 S, 173, 93 R, 50, 65, 93 SD, 38

[56] References Cited

U.S. PATENT DOCUMENTS

| 1,177,246 | 3/1916 | Homewood et al. | 277/194 |
| 2,564,070 | 8/1951 | Krug | 277/38 |
| 2,624,600 | 1/1953 | Voytech | 277/93 SD |
| 3,021,182 | 2/1962 | Schnackf | 277/81 R X |
| 3,061,319 | 10/1962 | Snyder | 277/93 R X |
| 3,101,200 | 8/1963 | Tracy | 277/93 R |
| 3,116,066 | 12/1963 | Koppins | 277/38 |
| 3,188,095 | 6/1965 | Van Vleet | 277/83 X |
| 3,500,503 | 3/1970 | Clareman et al. | 277/81 R X |
| 3,770,181 | 11/1973 | Stahl | 277/81 R |
| 3,792,867 | 2/1974 | Bergeron | 277/193 |
| 3,834,719 | 9/1974 | Shin et al. | 277/173 X |
| 3,889,958 | 6/1975 | Bennett | 277/194 X |
| 4,261,581 | 4/1981 | Hershey | 277/81 R X |
| 4,415,164 | 11/1983 | Johnson | 277/93 R X |

FOREIGN PATENT DOCUMENTS 58053  8/1911  Switzerland .................... 277/195

Primary Examiner—Allan N. Shoap
Attorney, Agent, or Firm—Cushman, Darby & Cushman

[57] ABSTRACT

The invention relates to a slide-ring seal which comprises a frame portion provided with connections for a sealing liquid and seal rings (4) provided with slide rings (5). Each slide ring (5) is thereby fastened in place by means of a shrinkage fit. In order to provide a better wearability and a better sealing effect, each seal ring (4) is formed by two ring portions (7, 8) which are fastened on each other by means of a radial shrinkage fit. The slide ring (5) is essentially L-shaped in cross-section so that the slide ring is provided with at least two supporting surfaces (9, 10) extending in parallel with the sliding surface. A radial clearance (11) is provided between the outer periphery of the slide ring (5) and the inner surface of the seal ring (4). The supporting surfaces (9, 10) of the slide ring (5) are supported on the seal ring (4), whereby the slide ring (5) is fastened on the seal ring (4) solely by an axial press fit.

5 Claims, 5 Drawing Figures

SLIDE-RING SEAL

The invention relates to a slide-ring seal comprising a frame portion provided with connections for a sealing liquid, and seal rings provided with slide rings, each slide ring being fastened in place by means of a shrinkage fit.

This kind of seal constructions are extremely well-known in various technical fields. Slide-ring seals are particularly suitable for e.g. pumps used in heavy process industries, by means of which pumps liquids containing solids and impurities are pumped.

In the production of slide-ring seals, the proper slide rings are usually manufactured e.g. of hard metal or silicon carbide and the frame portions are generally made of acid-proof steel. It is obvious that the materials are selected in accordance with the operative situation in each particular case.

Previously used solutions most usually comprise slide rings which are fastened on the seal rings thereof by means of a radially effective shrinkage fit. A disadvantage of such a radially effective shrinkage fit is that the sliding surface of the slide ring becomes distorted. It is obvious that this distortion can be adjusted at the production stage by machining of the sliding surface. However, considerable distortions of the sliding surface from the original planar surface may take place in an operative situation, whereby the temperature may considerably differ from the machining temperature of the sliding surface. Obviously enough, this kind of distorted surface cannot provide an efficient sealing. Distortion of the sliding surface may be due to, for instance, a disadvantageous geometrical form of the slide ring and a asymmetrical press force caused by the radial shrinkage. It has been found out in practise that slide rings fastened in a manner described above wear out rapidly, because sliding surfaces positioned against each other during the operation of the slide rings are not in parallel with each other over the whole sliding surfaces thereof, but some edge portions are close to each other, others being correspondingly at a greater distance. In other words, the sliding surfaces are at an angle with respect to each other.

The object of the invention is to provide a slide-ring seal which avoids the disadvantages of previously known solution and nevertheless is advantageous in production costs. This is achieved by means of a slide-ring seal according to the invention, which is characterized in that each seal ring is formed by two ring portions fastened on each other by means of a radial shrinkage fit, that the slide ring is essentially L-shaped in cross-section in such a manner that the slide ring is provided with at least two supporting surfaces extending in parallel with the slide surface, that a radial clearance is provided between the outer periphery of the slide ring and the inner surface of the seal ring and that said supporting surfaces of the slide ring are supported on the seal ring, whereby the slide ring is fastened on the seal ring solely by means of an axial press fit. The sealing between the seal ring and the slide ring can be ensured e.g. by means of elastic auxiliary sealing rings.

An advantage of the slide-ring seal according to the invention is mainly that fastening of the slide ring does not cause distortions of the planar form of the proper sliding surface. The solution according to the invention is also advantageous in view of the production and operative costs. One reason for the advantageous operative costs is the fact that the sliding surfaces which are positioned against each other are precisely in parallel in an operative situation, whereby uneven wearing is practically nonexistent.

Figure 2:
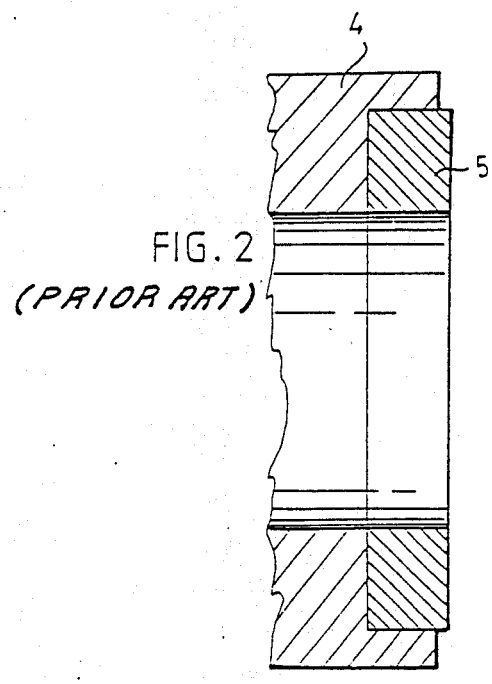
Figure 3:
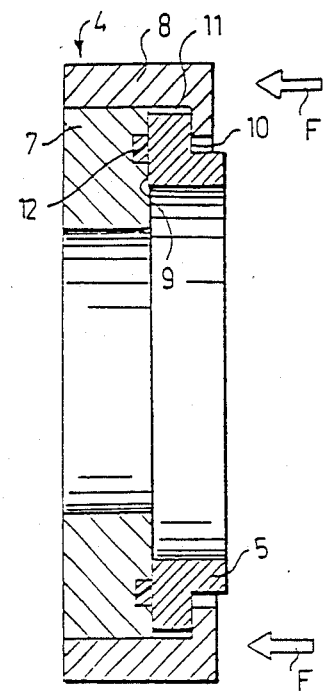
Figure 4:
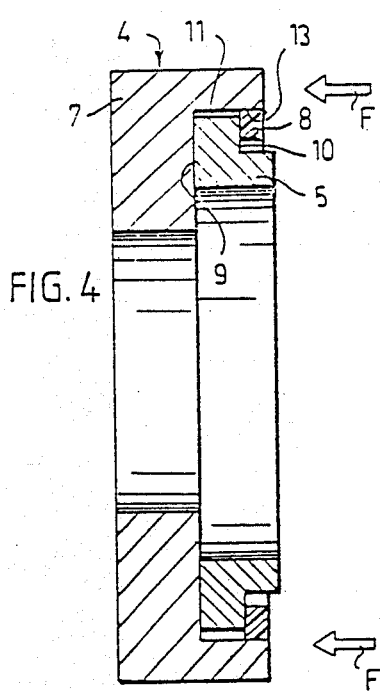
Figure 5:
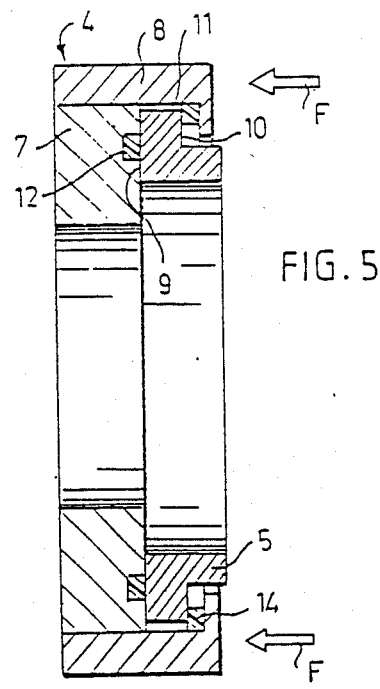

The invention will be more closely described in the following by means of the prior art illustrated in the attached drawing and some preferred embodiments of the invention, whereby FIG. 1 illustrates the main features of one specific slide-ring seal construction of the prior art, FIG. 2 is an enlarged view of a fastening structure of a slide ring used in connection with the known construction of FIG. 1, FIG. 3 illustrates the main features of a fastening structure of a slide ring according to the invention, FIG. 4 illustrates the main features of another fastening structure of the slide ring according to the invention, and FIG. 5 illustrates another embodiment of the fastening structure of the seal ring of FIG. 3.

FIG. 1 shows the main features of a slide-ring sealing construction known in the art. The frame portion of the sealing construction is generally indicated by the reference numeral 1 in the figure. A shaft of a pump is indicated by the reference numeral 2. The product to be pumped is, in turn, indicated by the reference numeral 3. Seal rings of the slide-ring seal are indicated by the reference numeral 4 and slide rings attached to said seal rings correspondingly by the reference numeral 5. A sealing liquid forming a lubrication film between the sliding surfaces of the seal rings 5 is indicated by the reference numeral 6 in FIG. 1. In addition, the arrows M and N of FIG. 1 show in principle the position of the inlet and outlet respectively of the sealing liquid. Said matters are fully obvious for one skilled in the art, so the construction of FIG. 1 and the operation thereof are not more closely described here.

The circle in FIG. 1 designates the point from where the enlarged view of FIG. 2 has been taken. The same reference numerals as in FIG. 1 are used in FIG. 2 at respective points. In the known construction of FIG. 2, the slide ring 5 is fastened on the seal ring 4 by means of a radially effective shrinkage fit. Said shrinkage fit is formed in a known manner by heating the seal ring 4 so that it expands. The slide ring 5 is thereafter placed inside the expanded seal ring which shrinks when cooling, the slide ring 5 being thereby fastened on the seal ring 4. It clearly appears from FIG. 2 that a radial force caused by the shrinkage of the seal ring is exerted on the slide ring 5, which force very easily causes distortion of the slide surface of the slide ring 5 (the right-hand surface in FIG. 2). After the cooling has been completed, the slide surface of the slide ring 5 is machined into a surface as even and planar as possible, which surface extends perpendicularly to the axis of symmetry of the seal. All the above steps belong to the prior art. The disadvantages of this prior art, however, are disclosed at the beginning of the description part.

The disadvantages mentioned above can be eliminated by means of the invention illustrated in FIG. 3. FIG. 3 shows in principle a detail corresponding to that illustrated in FIG. 2. Further, the same numerals as in FIG. 2 are used for corresponding parts in FIG. 3. The seal ring 4 according to the invention is formed by two ring portions 7 and 8. In addition, the slide ring 5 is formed into a part of an essentially L-shaped cross-section. By virtue of said L-shape, the slide ring 5 comprises at least two supporting surfaces 9 and 10 extending in parallel with the sliding surface. The seal ring 4 and the slide ring 5 formed in the manner described above are so dimensioned that a radial clearance is provided between the outer periphery of the slide ring 5 and the inner surface of the seal ring 4, said clearance being indicated by the reference numeral 11. In accordance with the invention, the seal ring 4 is further fastened on the slide ring 5 by means of an axial press fit. The term axial press fit means that the force which is caused by shrinking of the seal ring and which acts on the slide ring is parallel to the axis of symmetry of the seal only. In FIG. 3, this force is shown in principle by means of the arrows F. In the construction according to the invention, no radial press force is exerted on the slide ring, since a radial clearance is provided between the outer periphery of the slide ring 5 and the inner surface of the seal ring 4 over the entire axial length.

The construction of FIG. 3 can be manufactured in the following way, for example. The first ring portion 7 is positioned on an even surface. The slide ring 5 is placed on the ring portion 7 into the right position, whereby the ring portion 7 is supported on the first supporting surface 9 of the slide ring 5. The second ring portion 8 which is of an L-shaped cross-section and has been heated is thereafter positioned on the parts 5 and 7 according to FIG. 3, whereby the ring portion is in part supported on the second supporting surface 10 of the slide ring 5. If a sealing 12 is used in the construction, the sealing construction is exposed to an axial force e.g. by means of a suitable pressing device. The axial force is intended to compress the sealing 12, whereby the slide ring 5 is tightly pressed against the first ring portion 7. If there is no sealing 12, said press action is not necessary. After the cooling of the second ring portion 8 has been completed, a radial shrinkage fit exists between the first ring portion 7 an the second ring portion 8 and the slide ring is fastened in place by means of the axial press force exerted on the supporting surface 10.

FIG. 4 shows another preferred embodiment of the invention. The same reference numerals as in FIGS. 2 and 3 are used in FIG. 4 for corresponding parts. In the construction of FIG. 4, the first ring portion 7 is essentially L-shaped and is supported on the first supporting surface 9 of the slide ring in the same way as in the construction of FIG. 3. The second ring portion 8, in turn, is a ring of a rectangular cross-section and is radially supported on a counter surface 13 provided on the inner surface of the ring portion 7 and on the second supporting surface 10 of the slide ring. The construction can be manufactured essentially in the same way as in the solution of FIG. 4. The first ring portion 7 is heated, the slide ring 5 is positioned in place and the second ring portion 8 is also correspondingly positioned in place in a manner shown in FIG. 4. After the ring portion 7 has cooled, a radial shrinkage fit exists between the portions 7 and 8 and the slide ring 5 is fastened in place by means of the axial force F acting on the supporting surface 10. The slide ring 5 is not exposed to any kind of radial pressing in this construction, either, because of a radial clearance provided between the outer periphery of the slide ring 5 and the inner surface of the seal ring 4, said clearance extending over the whole axial length of the slide ring, as appears from FIG. 4.

The construction of FIG. 5 corresponds in principle to that of FIG. 3. An essential difference lies in that another sealing 14 is used. The use of two sealings 12, 14 is advantageous in that, for instance, the manufacturing tolerances of the ring portions 7 and 8 are not of crucial importance. This is an important aspect particularly in connection with large sealings. By virtue of the sealings, the slide ring 5 is able to freely adjust itself with respect to the ring portions 7 and 8.

The above embodiments are in no way intended to restrict the invention, but the invention can be modified within the scope of the claims in various ways. So the different parts do not, of course, need to be exactly similar to those shown in the figures, but parts of a different shape, for instance, can be used. It is further obvious that the seals according to the invention can be treated after the production stage; the slide surfaces, e.g., can be machined in any per se known manner, etc.

We claim:

1. In a slide ring seal assembly for a shaft a seal ring having a first annular portion providing a first axial facing flat surface and a second annular portion providing a second axial facing flat surface which is axially spaced from said first surface and which is parallel to the faces said first surface; a slide ring having an axial facing slide for slidably engaging a corresponding slide surface on another slide ring and also having at least two opposite axially facing supporting surfaces which are parallel to said slide surface, said supporting surfaces being held in engagement with said first and second surfaces on said seal ring by a shrinkage fit and there being a radial gap between the outer periphery of said slide ring and the inner surface of said seal ring, the dimension of said gap being large enough that said slide ring is fastened to said seal ring solely by an axial press fit between said supporting surfaces and said first and second surfaces.

2. A slide ring seal assembly as in claim 1 wherein said slide ring is essentially L-shaped in cross section, one leg of the L providing said supporting surfaces and the other leg of the L providing said slide surface.

3. A slide ring assembly as in claim 1 wherein said first annular portion of said seal ring is in engagment with said first supporting surface of said slide ring and wherein said second annular portion of said seal ring is essentially L-shaped in cross-section and is in engagement with the outer surface of said first annular portion and said second supporting surface of said slide ring.

4. A slide ring seal assembly as in claim 1 wherein first annular portion of said seal ring is essentially L-shaped in cross-section and is annular said first supporting surface of said slide ring and wherein said second annular portion of said seal ring is in engagement with the inner surface of said first annular portion and said second supporting surface of said slide ring.

5. In a slide ring seal as assembly for a shaft: a seal ring having a first annular portion providing a first axial facing flat surface and a second annular portion providing a second axial facing flat surface which is axially spaced from said first surface and which is parallel to and faces said first surface, one of said portions being disposed within the other and said portions being fastened to each other by a radial shrinkage fit; a slide ring, essentially L-shaped in cross section, having an axial facing slide surface on one leg of the L at the end thereof for slidably engaging a corresponding slide surface on another slide ring and also having two opposite axial facing supporting surfaces on the other leg of the L, said supporting surfaces being parallel to said slide surface, said supporting surfaces being held in engagement with said first and second surfaces on said seal ring by a shrinkage fit and there being a radial gap between the outer periphery of said slide ring and the inner surface of said seal ring, the dimension of said gap being large enough that said slide ring is fastened to said seal ring solely by an axial press fit between said supporting surfaces said first and second surfaces.

* * * * *